June 6, 1967  R. A. BROOKFIELD  3,323,809
TOOL HOLDER
Filed May 14, 1964  3 Sheets-Sheet 2
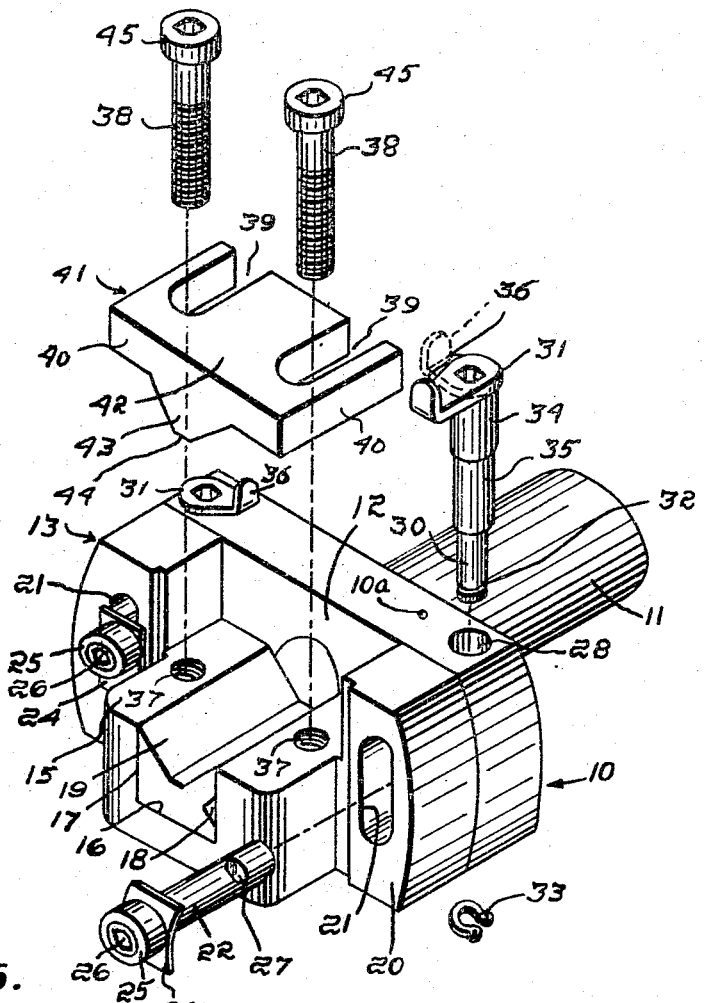
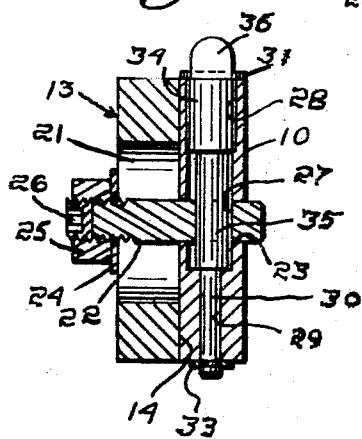
Inventor:
Richard A. Brookfield,
by Albert Spear,
Attorney

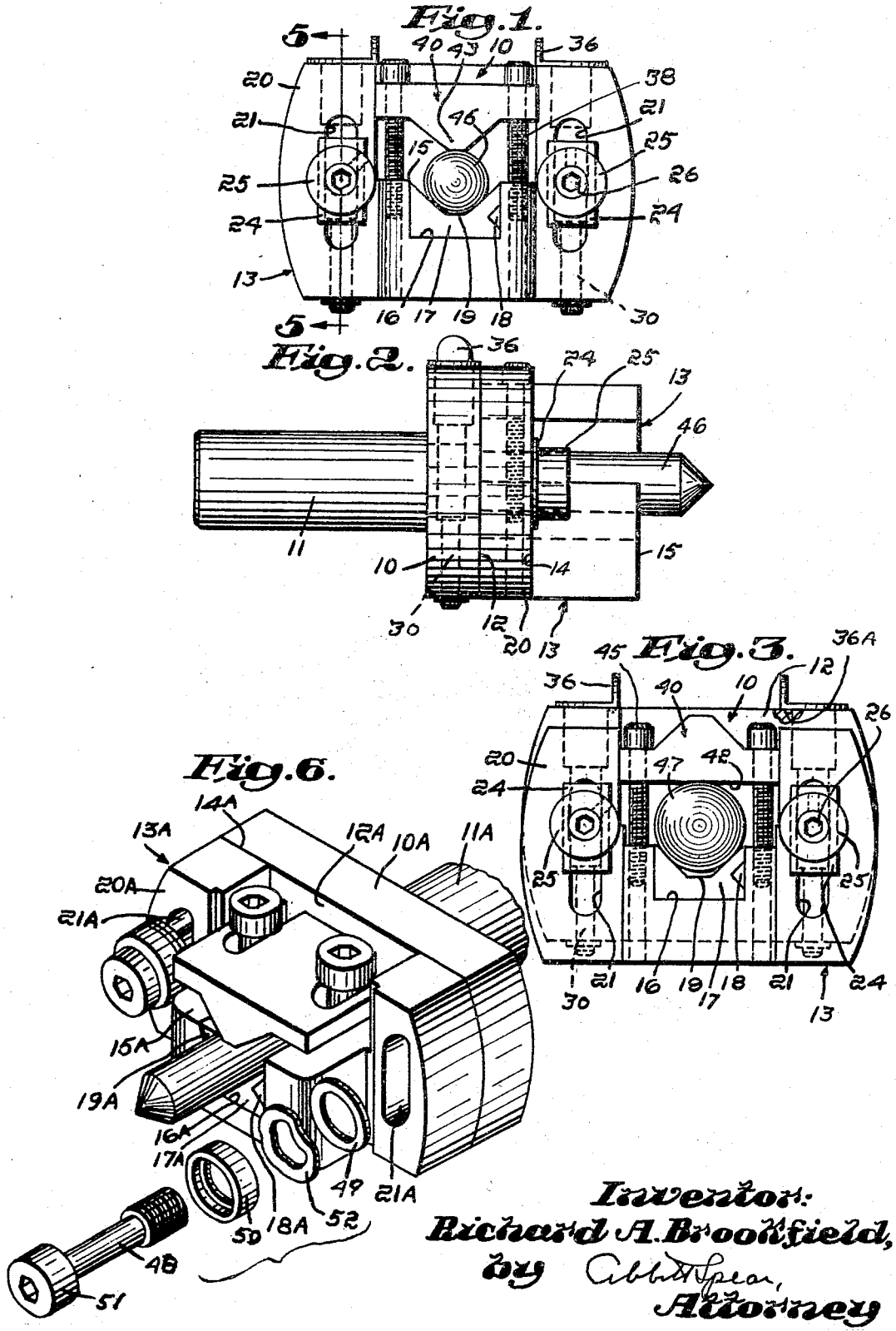

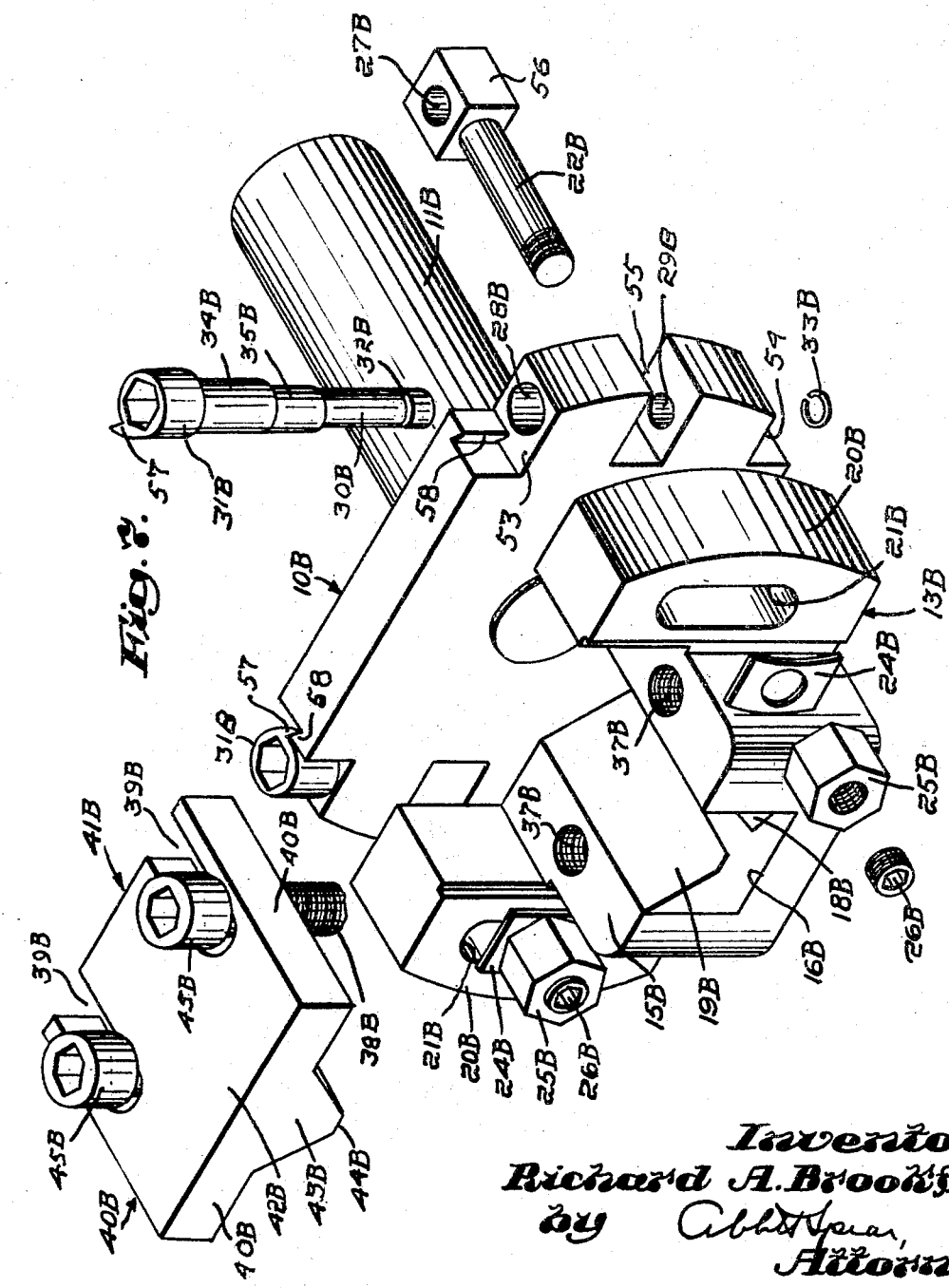

3,323,809
TOOL HOLDER
Richard A. Brookfield, 90 Spring Lane,
Canton, Mass. 02021
Filed May 14, 1964, Ser. No. 367,426
6 Claims. (Cl. 279—6)

The present invention relates to tool holders for such machines as lathes and drilling, cutting and reaming machines.

In the use of the above or other machines, tools, such as drills, counter bores and reamers, all provided on a wide range of diameters, must be used and their proper set-up presents problems both as to the time involved and the ease with which they may be securely alined for accurate use. Tool holders made in accordance with United States Patent No. 2,472,040 have proved to be satisfactory in use in many respects but do not afford maximum ease and convenience in making set-ups. Such tool holders have a body member provided with a rearwardly disposed, supporting shank and an inner or front flat face perpendicular to the axis of the shank and a tool supporting or holding member having a rear flat face parallel to and in contact with the flat face of the body member with releasable clamping connections between the body and supporting members but permitting the latter to be slid transversely of the former when the clamping connections are released. The supporting member has a substantially V-shaped tool supporting recess whose sides are in planes approximatley parallel to the shank axis and a clamping plate is attached to the supporting member to clamp a tool in its V-shaped recess.

The difficulty with such a tool stems from the fact the connections for clamping the tool supporting and body members together are in the form of screws parallel to the shank axis, extending through parallel slots in the supporting member and disposed at right angles to the axis, and threaded in the body member. These screws can be tightened and released only from the front of the tool holder where space is limited and, usually, once the clamping means are loosened, the tool supporting member moves by itself transversely relative to the body member unless manually held both while the tool is being centered and while the screws are again tightened.

The principal objective of the present invention is to provide clamping connections easily released from a clamping position and when so released frictionally holding the supporting member against accidental movement but permitting the set-up man to slide it transversely relative to the body member while adjusting its position as required by the diameter of the tool to be used.

In one embodiment of the invention, this objective is attained by interposing spring washers between the screw heads and the supporting member, and in other embodiments thereof, the screws are replaced by bolts with spring washers also disposed between their heads and the supporting member. The bolts are connected to cams carried by the body member with their axes parallel and disposed transversely thereof thus to place the cam actuating means where they are most readily accessible and to provide easily established and definite released and clamping positions.

Another objection to a tool holder in accordance with the above referred to patent results from the fact that the clamping plate thereof is removable with one face being usable with tools within one size range and the other face being usable with tools in a larger size range. While the adaptability of the tool holder for use with tools within either range is a real advantage, the time required to remove and replace the screws holding the clamping plate in position is an undesirable feature eliminated, by the present invention, by providing the clamping plate with rearwardly opening slots for the plate holding screws thereby enabling the clamping plate to be removed and reinserted simply by loosening the screws only to that extent that enables the plate to be slid from and into its place in the tool holder.

With presently available tool holders, usage sooner or later results in the surface of the tool supporting recess of the supporting member becoming so worn as to fail to provide suitably accurate support of the tools. In that event the supporting member must be replaced in its entirety. In accordance with the present invention, the supporting member is provided with a channel receiving an insert having a tool supporting recess and formed of carbide or hardened steel and keyed in place thus to ensure longer effective life and make replacement easy and relatively inexpensive should the recess become unfit for further use.

In the accompanying drawings, there are shown illustrative embodiments of the invention from which these and other of its objectives, novel features, and advantages will be readily apparent.

In the drawings:

FIGURE 1 is a front elevation of a tool holder in accordance with the invention with a tool within one size range held thereby, FIGURE 2 is a side elevation thereof, FIGURE 3 is a view similar to FIGURE 1 but with the holder supporting a tool within another size range, FIGURE 4 is a perspective view of the tool holder with certain parts shown in their exploded positions, FIGURE 5 is a section taken approximately along the indicated lines 5—5 of FIGURE 1, FIGURE 6 is a perspective and partly exploded view of another embodiment of the invention, and FIGURE 7 is a like view illustrating yet another embodiment of the invention.

In the embodiment of the invention illustrated by FIGURES 1–5, the tool holder has a body member 10 provided with a rearwardly extending shank 11 for entry into the bore of a tail stock or turret, for example. The body member 10 has a front, flat face 12, the plane of which is at right angles to the axis of the shank 11.

A tool supporting or holding member, generally indicated at 13 has a flat rear face 14 and a central shoulder 15 provided with a channel 16 in which a block 17 of carbide or hardened steel is held in place as by a removable key 18. The block 17 has an approximately V-shaped, tool supporting recess 19 whose sides are at right angles to the rear face 14. The tool supporting member 13 is provided with side portions 20 which extend vertically beyond the shoulder 15 with the latter projecting forwardly with respect to the side portions 20. The side portions 20 have parallel slots 21, each to receive a bolt 22. Each bolt 22 extends rearwardly through an appropriate one of the slots 21 and through a bore 23. Each bore 23 extends through the body member 10 with the bores being in a plane inclusive of the axis of the shank 11, one on each side thereof. A spring washer 24 is carried by each bolt 22 between a nut 25 threaded on its exposed front end and the proximate face of the supporting member 13. A lock nut 26 is threaded into each nut 25 against the end of its bolt 22. Adjacent its other end, each bolt 22 has a slot 27 extending transversely therethrough and disposed to register with the counterbore 28 of a bore 29 extending transversely of the body member 10, see FIGURE 5. The two bores 29 are parallel and equidistant from the axis of the shank 11 and their counterbores 28 intersect respective ones of the bores 23 at right angles.

Studs 30 are provided, one for each bore 29 and extending therethrough, with a head 31 at one end and an annular groove 32 at its other end, see FIGURE 4, to receive the retaining ring 33. Each stud 30 includes a portion 34 fitting the counterbore 28 and a cam 35 rotatable therein and extending through the appropriate bolt slot 27 into the inner end of the corresponding counterbore 28. With this arrangement, the bolts 22 are drawn into and out of a position in which the members 13 and 10 are securely clamped together by turning the studs 30 in one direction into a predetermined locking position and released from such clamping engagement by turning them to a predetermined extent in the opposite direction into a predetermined released position. The spring washers 24 which are between the nuts 25 and the front faces of the side portions 20 of the member 13 resiliently hold the members together to prevent accidental movement of the tool supporting member 13 relative to the body member 10 in the released position in which the tool supporting member 13 may be manually moved to center its tool. For convenience in turning the studs 30 and in enabling the operator to determine at a glance whether or not the tool supporting member 13 is securely clamped to the member 10, the stud heads 31 are provided with vertically disposed, direction indicating tabs 36. To minimize the possibility of the tool supporting member becoming unclamped, each stud head 31 is provided with a downward projection 36A entrant of a detent recess 10a formed in the periphery of body member 10 and thereby positively establishing a locking position. Adjustments are effected by means of the nut 25.

The shoulder 15 has a threaded bore 37 on each side of the V-block receiving channel 16, each bore 37 receiving a screw 38 extending downwardly through a rearwardly opening slot 39 of which there is one in each side portion 40 of a generally indicated clamping plate 41, the slots 39 being parallel. The opposite faces of the side portions 40 are flat and parallel and the central part 42 of one face of the plate 41 is flat with the opposite face being in the form of an approximately V-shaped projection 43 whose tool engaging extremity 44 is parallel to the flat faces of the clamping plate 41. When the plate 41 is positioned on the tool supporting member 13 with the open end of its slots 39 disposed towards the body member 10, it is clamped in place by the heads 45 of the screws 38, as they are advanced in the bores 37 with either the face 42 or the projection 43 disposed towards the tool supporting recess 19 thereby to clamp a tool therein. When it is necessary to reverse the plate 41, the screws 38 are turned in the appropriate direction to an extent sufficient to enable the plate 41 to be slid free, inverted, slid back in place, and then anchored by again tightening the screws 38. For convenience in inserting the plate 41 under the heads of the screws 38, the central part projects beyond the ends of its margins. As will be apparent from a comparison of FIGURES 1 and 3, the face 44 is disposed towards the V-shaped recess 19 when a tool 46 of relatively small diameter is to be used (FIGURE 1) and the face 42 is employed with a tool 47 of a relatively larger diameter (FIGURE 3), each face being usable with tools within substantial size ranges by appropriate adjustments of the supporting member 13 transversely relative to the body member 10.

In use, it is necessary to position a tool axially with respect to the shank 11 and unless one tool replaces another of the same size, it is necessary to move the tool supporting member 13 relative to the body member 10 and then clamp it thereto in its newly established position. With such holders in accordance with the invention, this adjustment of tool position is easily effected since it is only necessary to turn the studs 30 into the position in which the holding member is released thereby to enable the member 13 to be slid manually, against the position-holding action of the spring washers 24, in the required direction until the tool supported thereby is centered.

The embodiment of the invention illustrated by FIGURE 6 is generally similar and its corresponding parts are distinguished by the suffix addition A. The difference in this embodiment of the invention, as shown in the drawings, is in the clamping means connecting the flat rear face 14A of the tool supporting member 13A against the flat front face 12A of the body member 10A.

In this embodiment of the invention, screws 48 extend through the slots 21A in the tool holding member 13A and are threaded into the body member 10A. Each screw 48 is shown as carrying a washer 49 in engagement with the side portion 20A, a cup-shaped washer 50 accommodating a screw head 51 and an intermediate spring washer 52. By turning each screw 48 to an appropriate extent the tool holding member 13A is so released that it may be manually moved to center its tool against the holding action of the spring washer 52.

The embodiment of the invention illustrated by FIGURE 7 is generally similar to that illustrated by FIGURES 1–5 and its corresponding parts are distinguished by the suffix addition "B."

In this embodiment of the invention the body member 10B has pairs of shoulders 53 and 54 between each pair of which the bores 29B extend. The body member 10B has transversely alined slots 55 opening through its periphery and intersecting the counterbored portions 28B. Bolts 22B are provided with heads 56 of rectangular section and dimensioned to slidably fit the slots 55. Each head 56 has a slot 27B to receive the cam portion 35B of an actuating stud 30B. Each stud 30B has its head 31B provided with a laterally projecting locking portion 57 engageable with a stop portion 58 with which each shoulder 53 is provided. When the portions 57 and 58 are in engagement, the locking position of the tool holder is established with adjustments being made by means of the nuts 25B and their associated lock nuts 26B.

It will thus be appreciated that tool holders in accordance with the invention are adapted to be clamped in a tool holding position or released into a position in which they are held against accidental movement but yieldable to permit manual movement necessary for tool centering.

I claim:

1. A tool holder comprising a body member having a rearwardly disposed shank, a flat front face, and a pair of parallel, transverse bores midway between which the shank axis is located, a tool supporting member having a flat rear face and a pair of parallel slots extending from face-to-face of said tool supporting member, each slot being disposed in alinement with an appropriate one of said bores, each bore having an opening in the flat front face of said body member, a bolt extending through each slot and through the alined opening with one end intersecting the alined bore and with its other end exposed at the front end of the tool supporting member, each of said first named bolt ends having a transversed slot, a nut threaded on each exposed bolt end, and resilient means interposed between each nut and tool supporting member, an actuating member rotatable in each bore of the body member and including an operating portion exposed on the periphery thereof and a cam portion extending into the slot of the end of the appropriate bolt whereby, when said actuating members are turned in one direction or the other, said tool supporting member is clamped against said body member or released from said clamping engagement.

2. The tool holder of claim 1 in which the openings in the front face of the body member are in the form of transversely alined slots opening through the periphery of the body member and the first named bolt ends are in the form of slot-fitting heads.

3. The tool holder of claim 1 in which the body member and the actuating members have portions interengaging in their clamping positions.

4. The tool holder of claim 1 in which each of the exposed portions of the actuating members has a laterally projecting portion and the body member has laterally exposed stops, one for each actuating member and engageable by its laterally projecting portion in the clamping position thereof.

5. The tool holder of claim 1 in which each operating portion includes an indicating part giving visual indication of the position of the connection of which it is a part.

6. The tool holder of claim 1 in which each cam operated portion includes an exposed operating part, the body member having stops, one for each exposed operating part and engaged thereby in the clamping position thereof.

References Cited

UNITED STATES PATENTS

| | | | |
|---|---|---|---|
| 2,389,243 | 11/1945 | Tillett | 269—271 |
| 2,460,890 | 2/1949 | Lassy | 279—6 |
| 2,472,040 | 5/1949 | Brookfield | 279—6 |
| 2,567,498 | 9/1951 | Strauss | 279—6 |
| 3,174,766 | 3/1965 | Cox | 279—6 |

ROBERT C. RIORDON, *Primary Examiner.*

H. V. STAHLHUTH, E. A. CARPENTER,
  *Assistant Examiners.*